United States Patent [19]

GMEINER et al.

[11] Patent Number: 4,938,510
[45] Date of Patent: Jul. 3, 1990

[54] LOCKING DEVICE FOR A FLUID PLUG-IN CONNECTION BETWEEN A FLUID PIPE AND A CONNECTING PART

[75] Inventors: Gunter Gmeiner, Rudolf Andres, Sindelfingen; Hermann Möller, Gärtringen; Kurt Schaible, Aidlingen, all of Fed. Rep. of Germany

[73] Assignee: Daimler-Benz AG, Stuttgart, Fed. Rep. of Germany

[21] Appl. No.: 354,831

[22] Filed: May 22, 1989

[30] Foreign Application Priority Data

May 21, 1988 [DE] Fed. Rep. of Germany ....... 3817472

[51] Int. Cl.⁵ .............................................. F16L 35/00
[52] U.S. Cl. ......................................... 285/39; 285/305
[58] Field of Search .................................. 285/305, 39

[56] References Cited

U.S. PATENT DOCUMENTS

| | | | |
|---|---|---|---|
| 1,881,980 | 10/1932 | Thomas, Jr. ................... | 285/305 |
| 3,154,327 | 10/1964 | Rothschild ..................... | 285/305 X |
| 3,512,808 | 5/1970 | Graham ......................... | 285/305 X |
| 4,423,892 | 1/1984 | Bartholomew ................. | 285/305 X |
| 4,453,747 | 6/1984 | Bimba ........................... | 285/305 |
| 4,723,796 | 2/1988 | Nattel ............................ | 285/305 X |

FOREIGN PATENT DOCUMENTS

| | | |
|---|---|---|
| 1425470 | 11/1968 | Fed. Rep. of Germany . |
| 2849133 | 5/1980 | Fed. Rep. of Germany . |
| 2542284 | 8/1980 | Fed. Rep. of Germany . |
| 7918697 | 8/1980 | Fed. Rep. of Germany . |
| 3440753 | 5/1986 | Fed. Rep. of Germany . |
| 1030535 | 5/1966 | United Kingdom ................ 285/305 |

OTHER PUBLICATIONS

Fluid Power, New Products by Michael S. Weil, vol. 35, No. 5, May 1982, p. 28.
IBM Technical Disclosure Bulletin, vol. 20, No. 9, Feb. 1978, pp. 3662 and 3663.

Primary Examiner—Dave W. Arola
Attorney, Agent, or Firm—Evenson, Wands, Edwards, Lenahan & McKeown

[57] ABSTRACT

A locking device for a plug-in connection between a fluid pipe, provided with a shaped-on radially protruding abutment, and a connecting part utilizes a clamp, which can be guided in the connecting part, two branches of the clamp overlapping the abutment of a correctly plugged-in fluid pipe in order to secure the plug-in connection against axial separation. A guide slot, for receiving the clamp, opens along its length towards a plug-in side of the connecting part in order to prevent incorrectly produced plug-in connections, i.e. unsecured conditions, while the clamp itself is provided with a guard which can be displaced in the elongated opening of the guide slot. This guard ensures that the abutment of the plugged-in fluid pipe is either overlapped by the clamp branches, in the case of a correct plug-in connection, or remains visible above the plug-in side of the connecting part, in the case of an incorrectly executed plug-in connection.

16 Claims, 1 Drawing Sheet

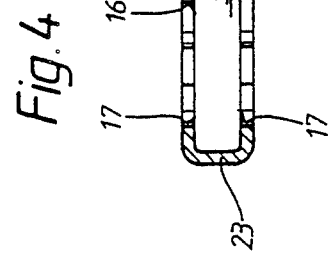
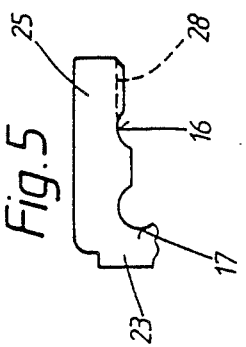
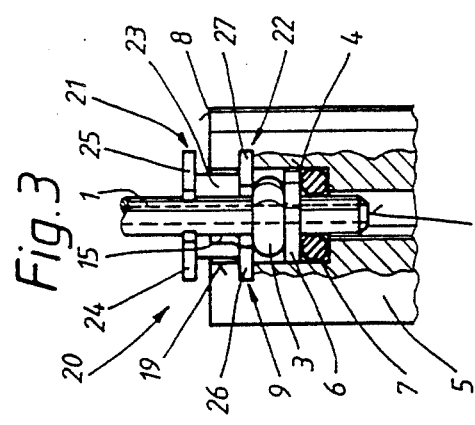
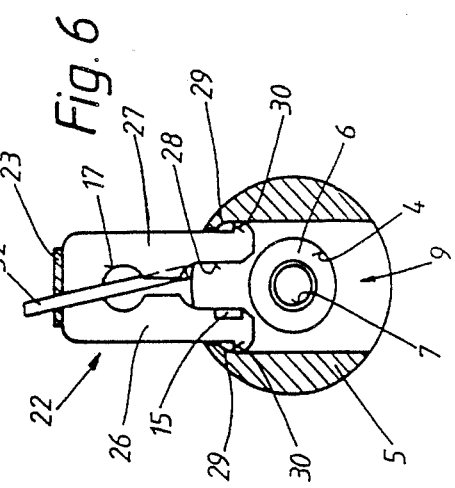
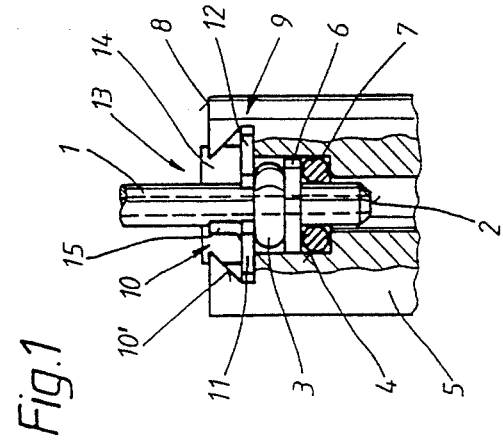
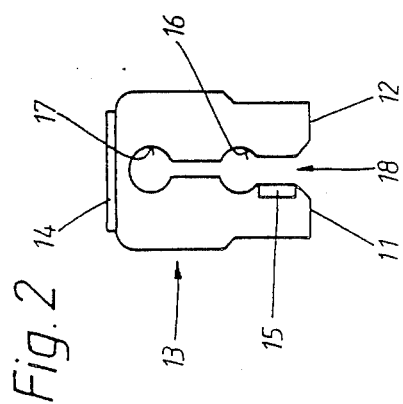

LOCKING DEVICE FOR A FLUID PLUG-IN CONNECTION BETWEEN A FLUID PIPE AND A CONNECTING PART

BACKGROUND AND SUMMARY OF THE INVENTION

The present invention generally concerns a locking device for a fluid plug-in connection between one end of a fluid pipe and a connecting part, and more particularly to an arrangement for preventing insertion of the locking device unless the parts of the fluid plug-in connection are properly positioned.

A locking device of the general type concerned here for a quick action coupling is disclosed by German Published, Unexamined Patent Application (DE-OS) 3,440,753. This quick action coupling contains a coupling nipple which has to be screwed by an internal thread onto the end of the fluid pipe to be connected. The coupling nipple can then be inserted into a coupling sleeve, which represents the connecting part, up to a stop and can be secured in the connecting part by a U-shaped sealing piece which can be inserted into a guide slot or recess of the coupling sleeve, two branches of the sealing piece overlapping a radially protruding abutment of the coupling nipple.

Also disclosed is a substantially simpler, and therefore more cheaply manufacturable plug-in connection for pipes, particularly in motor vehicles, having a U-shaped lockings clamp guided in guide holes as shown in German Published, Unexamined Patent Application (DE-OS) 1,425,470. It can be used in hydraulic systems of vehicles wherever individual fluid pipes have to be connected by plugging into connecting parts of valves, lifting cylinders and the like. The high pressures occurring, up to 190 bar, demand positive pipework locking. The design arrangement of this locking system and plug-in connection greatly aids the simplification of the manufacture, assembly and maintenance because the fluid pipe itself is provided with an upset, radially protruding, circumferential abutment in collar shape, which is overlapped by a U-shaped clamp guided transversely to the axis of the connecting hole in two guide holes tangentially penetrating the connecting hole of the connecting part. No special plug is required for this type of plug-in connections so that sealing problems between a plug and the fluid pipe which has to be connected are avoided ab initio.

However, it is not possible to exclude erroneous, i.e. incorrectly or incompletely plugged-in connections, by means of the two above-noted locking devices, because the plane of the guide holes for the clamp must necessarily be located at a distance below the plug-in side of the connecting part. It can therefore occur that the clamp, or its two branches, are inserted under the abutment of a fluid pipe, which is not correctly plugged in, instead of correctly overlapping the abutment. However, because the abutment can, even then, be immersed in the connecting hole, the connection appears to be correctly plugged in and locked, from a superficial visual inspection.

Other locking devices for fluid plug-in connections which have a U-shaped locking clamp are also disclosed. Thus, for example, such a locking device is known from German Published, Examined Patent Application (DE-AS) 2,542,284 which, however, does not secure individual fluid pipes but, rather, plug-in elements which combine several fluid pipes into blocks the clamp being guided in guide holes, as in the state of the art forming the generic type of plug-in connection already discussed.

A locking device with a U-shaped clamp for fluid plug-in connections is also disclosed by German Published, Unexamined Patent Application (DE-OS) 2,849,133 in which individual plugs, each tightly connected to a fluid pipe, can be locked in connecting holes. In this case, furthermore, the guide of the clamp is open towards the plug-in side of the connecting part but, in contrast to the presently disclosed locking device, not along the length of but transversely to the insertion direction of the clamp. Although visual inspection of the plug-in connections produced by widening of the already fully inserted clamps is also possible in this case, it does not lead to such unambiguous results as those of the locking device of the present application because of the shape of the plug.

Also, a U-shaped clamp is known from DE-GM 7,918,697 for joining together two fluid pipes aligned axially or for joining a fluid pipe and a connecting part accepting it, which clamp overlaps on the outside an abutment formed by peripheral grooves on each of the two fluid pipes or on one fluid pipe and the connecting part.

Therefore, an object of the present invention is to provide improved assembly reliability of a locking device for a plug-in connection between a fluid pipe and a connection part.

These and other objects are achieved in certain preferred embodiments of the present invention by employing an arrangement which prevents insertion of the plug-in connection unless all parts of the connection are properly positioned.

Thus, in certain preferred embodiments of the present invention, the guide slot for the locking clamp is open to the plug-in side of the connecting part by a longitudinal opening. The clamp itself is provided with a guard which extends at least over the total depth within the elongated opening. When the clamp is inserted into the guide slot, the guard extends over a defined space within the elongated opening which reduces the clearance of the elongated opening, projected in the insertion direction, to a dimension which is smaller than the external dimension of the abutment on the fluid pipe.

This description, which applies more to the mode of operation, makes it clear that the problem described above, i.e. that the clamp runs under the abutment of the fluid pipe instead of overlapping it, can no longer occur in the manner stated if the locking device and guard arrangement is used according to preferred embodiments of the present invention. This is because the guard at least ensures that, when the clamp is inserted, the abutment is either seated properly in the connecting hole, where it belongs, or remains easily visible above the plug-in side of the connecting part. In intermediate positions of the abutment, the clamp simply cannot be inserted because the guard then runs into the abutment.

No disclosure of the arrangement of the present application with respect to either the guidance of the clamp or the clamp itself, can be obtained from any of the items mentioned above. In particular, a guard formed on the clamp and inevitably colliding with an abutment incorrectly positioned in the connecting hole cannot be deduced from the disclosure of the items discussed above.

According to certain preferred embodiments of the present invention, there are several possibilities for the geometric configuration of the guide slot elongated opening satisfying the specified requirements, e.g. T-groove guidance or dovetail type guides. In addition, different configurations of the clamp itself are disclosed; among these, one form with a preassembly capability is particularly emphasized.

Other objects, advantages and novel features of the present invention will become apparent from the following detailed description of the invention when considered in conjunction with the accompanying drawings.

BRIEF DESCRIPTION OF THE DRAWINGS

FIG. 1 shows a first, simple embodiment of the locking device of the present invention in a sectional representation, FIG. 2 shows a clamp of the simple embodiment illustrated in FIG. 1 in plan view, FIG. 3 shows a second improved embodiment of the locking device in accordance with the present invention in a sectional representation, FIG. 4 shows a central longitudinal section through the clamp of the second embodiment of FIG. 3, FIG. 5 shows a plan view of the clamp of FIG. 4, and FIG. 6 shows a plan view of the clamp located in the connecting part in a preassembly position.

DETAILED DESCRIPTION OF THE DRAWINGS

Exemplary embodiments of the locking device according to the invention are shown in the drawings and are described in more detail below.

A fluid pipe 1 is inserted in a connecting hole 4 of a connecting part 5 at one end 2 with an abutment 3 axially adjacent to the end 2 of the fluid pipe 1 and protruding radially in the form of an annular collar.

The abutment 3 is seated in a support ring 6 pressed into the connecting hole 4 while a sealing ring 7 located in turn under the support ring 6 is in sealing contact with the fluid pipe 1.

The connecting part 5 which, for example, is part of a valve, lifting cylinder or the like, has a guide slot 9 running transversely to the axis of the connecting hole 4 and parallel to the plug-in side 8 into which emerges the connecting hole 4 of the connecting part 5. In FIG. 1, the guide slot 9 forms the bottom of a dovetail guide 10' by means of an elongated opening 10 extending in the plug-in side 8 of the connecting part 5. A pair of branches 11/12 of a clamp 13 guided transversely to the axis of the connecting hole 4 can be inserted along the guide slot 9 into a position overlapping the abutment 3 of the fluid pipe 1.

An upwardly protruding tab 14 of the clamp 13 facilitates the manual insertion of the clamp. A guard 15 is formed on one of the branches 11, 12 of the clamp 13 and this protrudes from the branch parallel to the axis of the connecting hole 4. The height of the guard 15 corresponds to the recess depth of the dovetail guide 10', which opens up the guide slot 9 along its length by means of its longitudinal opening 10, so that the free end of the guard 15 is located approximately in the plane of the plug-in side 8 of the connecting part 5.

FIG. 2 shows that the clamp 13 is U-shaped and that a first recess 16, corresponding to the diameter of the fluid pipe 1, and a second recess 17 are enclosed between the two branches 11 and 12 separated by a longitudinal gap 18.

The first recess 16, which accepts the fluid pipe 1 in the inserted position of the clamp 13, converges like a clip on its flanks pointing towards the free ends of the branches 11 and 12, so that the clamp 13 can only be inserted to embrace the inserted fluid pipe 1 by temporary elastic widening of the longitudinal gap 18. The branches 11 and 12 are chamfered at their front corners pointing towards the longitudinal gap 18 in order to facilitate the insertion of the clamp 13. The clamping procedure can only take place either with the abutment 3 of the fluid pipe 1 fully immersed in the connecting hole 4 or located so as to be visible above the plug-in side 8. In all intermediate positions of the abutment 3, the guard 15 runs into the abutment 3 during the insertion procedure and prevents further movement of the clamp 13.

FIG. 3 agrees in many parts with FIG. 1. To this extend, the same reference numerals are used for the same parts, which require no further special description. The variant of the locking device shown in FIG. 3 differs, firstly, in the shape of the elongated opening of the guide slot 9, which is designed in this particular embodiment as the transverse gap of a T-groove 19. The clearance of the longitudinal opening, i.e. the "stem" of the T-groove, is here again therefore; as in FIG. 1, smaller than the width of the guide slot 9.

A double U-shaped clamp 20 is the second main difference from the first embodiment. This clamp 20 has two arms 21 and 22 which are connected together by a web 23 and are each forked into a pair of branches 24 and 25, as well as 26 and 27. The width of the web 23 is smaller than the clearance of the elongated opening of the guide slot 9. Its length, which determines a free space 31 between the two arms 21 and 22, is at least as large as the distance between the guide slot 9 and the plug-in side 8 so that one arm 22, with its branches 26 and 27, is displaceably guided in the guide slot 9 and the branches 24 and 25 of the other arm 21 remain above the plug-in side 8.

The guard 15 on the branch 26 has the same function as in the embodiment illustrated in FIG. 1. In this case, it also prevents the insertion of the abutment 3 into the free space 31 between the arms 21 and 22 during the insertion of the clamp 20.

The fluid pipe 1 is therefore embraced by two pairs of branches in the second locking device embodiment, but only the branches 24 and 25 form a clip type seating 16, analogous to FIG. 1, in this case, as may be seen from FIG. 4 and 5. These two figures show further views, rotated in each case by 90 degrees, of the clamp 20 sectioned along its longitudinal center line, the clamp 20 being symmetrical about this line apart from the guard 15.

A preassembly position of the clamp 20 in the guide slot 9 is made possible by the measures shown in FIG. 6. This shows a plan view onto the cylindrical connecting part 5, the view being sectioned at the level of the guide slot 9. Here again, the same reference numbers apply to the same parts. In order to embrace the fluid pipe 1, the branches 26, 27 have a seating 28 with mutually parallel flanks. Shoulders 29 protrude at one end on both sides into the guide slot 9, these shoulders permitting a slightly smaller clearance relative to the width of the guide slot 9, which clearance corresponds, however, to the external dimension of the arm 22. On the outside of their free ends, the two branches 26 and 27 have stepped protrusions 30, which span an external dimension corresponding to the breadth of the guide slot 9 but which pass through the clearance between the restriction shoulders 29 of the guide slot 9 only with elastic deformation of the arm 22 i.e. the branches 26, 27 have to be pressed together.

Because the web 23 is less wide than the elongated opening of the guide slot 9, the clamp 20 or its arm 22 can be inserted, web first, without deformation only from the other end of the guide slot 9 rearwards into the preassembly position shown, from which it can be pushed into its secure position in the opposite direction after the complete insertion of the fluid pipe 1.

The seating 28 has at least one opening dimension which corresponds to the diameter of the fluid pipe 1. There is no space available for a clip arrangement here because the necessary elastic widening of the branches 26/27 would be prevented by the tight guidance of the stepped protrusions 30 in the guide slot.

Because, however, an incorrectly positioned abutment 3 remains, in fact, above the arm 21 of the clamp 20 in the second embodiment, visual inspection of the plug-in connection is still further simplified. The recesses 17 have a tool acceptance function. In order to separate the locked plug-in connection, it is only necessary to insert a small screwdriver or a strong wire 32 in order to lever out the clamp 13 or 20 from their inserted position while releasing the clip connections (recesses 16).

Both clamp shapes can be inexpensively manufactured as sheet metal punched bent parts by mass production. In the case of the clamp 20, the arm 21 could also be punched wider than the arm 22 in order to avoid confusion so that it could be inserted into the guide slot.

Both embodiments of guide slots or their elongated openings can be manufactured without difficulty by machining (milling, broaching).

Other extension directions, e.g. at right angles to the plane of the guide slot, could also be provided in order to design the means permitting the preassembly position. In this case, the guide slot could, for example, have at its bottom a groove not extending over its complete length and in which a tab protruding downwards parallel to the guard could engage in the relevant clamp.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Locking device for a fluid plug-in connection between one end of a fluid pipe provided with a radially protruding abutment axially adjacent the one end and a connecting part for receiving the one end of the fluid pipe and the abutment in a connecting hole opening up towards an end face of the connecting part at a plug-in side of the connecting part to form a seal comprising:

U-shaped clamping means for securing the plug-in connection against axial separation, the U-shaped clamping means overlapping the abutment in an installed position so as to maintain the abutment in the connecting hole;

guide slot means in the connecting part spaced from the plug-in end face of the connecting part for receiving the U-shaped clamping means, the guide slot means having an elongated opening at the plug-in end face of the connecting part, the elongated opening having a minimum clearance less than a width of the guide slot means; and guard means for preventing insertion of the U-shaped clamping means when the abutment is improperly positioned in the guide slot with respect to the U-shaped clamping means, the guard means projecting from the U-shaped clamping means between the guide slot means and the plug-in end face of the connecting part.

2. Locking device according to claim 1, wherein the guide slot means is formed by a dovetail guide means with an elongated opening having a longitudinal axis which intersects an axis of the connecting hole and further having a recess depth substantially equal to a distance between the guide slot means and the plug-in side.

3. Locking device according to claim 1, wherein the guide slot means is part of a T-groove means formed in the plug-in end face of the connecting part, a longitudinal axis of the T-groove means intersecting an axis of the connecting hole and having a recess depth substantially equal to the distance between the guide slot means and the plug-in end face of the connecting part.

4. Locking device according to claim 1, wherein protrusions are provided in the guide slot means, and on a portion of the U-shaped clamping means which is guided in the guide slot means, the protrusions permitting deformation free insertion of the U-shaped clamping means into the guide slot means as far as a defined preassembly position.

5. Locking device according to claim 1, wherein the U-shaped clamping means has a double U-shaped with two arms extending at least approximately parallel to one another, each of the two arms being forked into a pair of branches respectively which are connected together by a web, and spaced by a free space, wherein a height of the free space between the two arms produced by the web corresponds at least to a distance between the guide slot means and the plug-in end face of the connecting part of the connecting part and is approximately equal to a height of the guard means which is formed on one of the branches of the clamping U-shaped clamping means, and wherein a width of the web is smaller than the clearance of an elongated opening of the guide slot means.

6. Locking device according to claim 5, wherein the U-shaped clamping means has at least one recess located at a distance from the fluid pipe and protruding, in the installed position of the U-shaped clamping means, beyond a contour of the connecting part, the recess being provided for introducing an extraction tool for removing the U-shaped clamping means from the guide slot means.

7. Locking device according to claim 5, wherein the guide slot means at one end has shoulders slightly restricting the width of the guide slot means on both sides and that one of the pairs of branches of the U-shaped clamping means, which is guided in the guide slot means, have an external dimension corresponding to the restriction of the guide slot means by the shoulders, which external dimension is widened at free ends of the one of the pair of branches to the width of the guide slot by stepped protrusions on both sides whereby the free ends of the one of the pair of branches cannot be pushed past the shoulders of the guide slot without elastic deformation of the U-shaped clamping means.

8. Locking device according to claim 7, wherein the one of the pair of branches, which is guided in the guide slot means, has a clearance in an axial direction of the connecting hole which at least corresponds to an external diameter of the fluid pipe and that the other of the pair of branches, located above the plug-in end face of the connecting part of the connecting part when the clamp is inserted, has a seating, pointing in an axial direction of the connecting hole and embracing the fluid pipe like a clip, whereby the U-shaped clamping means is secured against displacement, without deformation in the installed position.

9. Locking device according to claim 1, wherein the U-shaped clamping means has a pair of branches, which are guided in the guide slot means and form a seating pointing in an axial direction of the connecting hole for embracing the fluid pipe like a clip, whereby the U-shaped clamping means is secured against displacement, without deformation, in the installed position.

10. Locking device according to claim 9, wherein a clamped external dimension of the pair branches in a region of the seating is slightly smaller than the width of the guide slot means.

11. Locking device according to claim 1, wherein the U-shaped clamping means has at least one recess located at a distance from the fluid pipe and protruding, in the installed position of the U-shaped clamping means, beyond a contour of the connecting part, the recess being provided for introducing an extraction tool for removing the U-shaped clamping means from the guide slot means.

12. Locking device according to claim 1, wherein the guide slot means extends substantially parallel to the plug-in end face of the connecting part.

13. Locking device according to claim 1, wherein the guard means projects from the U-shaped clamping means between the guide slot means and the plug-in side.

14. Locking device according to claim 1, wherein the U-shaped clamping means has a pair of spaced branches for surrounding the fluid pipe 1.

15. Locking means according to claim 14, wherein the guard means projects from one of the spaced branches.

16. Locking device according to claim 1, wherein the U-shaped clamping means is inserted in the guide slot means transverse to an axis of the plug-in correction.

* * * * *